(12) United States Patent
Bartow (10) Patent No.: US 11,638,415 B2
(45) Date of Patent: May 2, 2023

(54) MAGNETIC QUICK-RELEASE CONNECTOR FOR PET COLLARS

(71) Applicant: Upscale Pet Products LLC, Chicago, IL (US)

(72) Inventor: Douglas Christopher Bartow, Chicago, IL (US)

(73) Assignee: UPSCALE PET PRODUCTS LLC, Chicago, IL (US)

( * ) Notice: Subject to any disclaimer, the term of this patent is extended or adjusted under 35 U.S.C. 154(b) by 106 days.

(21) Appl. No.: 17/179,700

(22) Filed: Feb. 19, 2021

(65) Prior Publication Data
US 2022/0264849 A1    Aug. 25, 2022

(51) Int. Cl.
*A01K 27/00*    (2006.01)
*A44B 18/00*    (2006.01)

(52) U.S. Cl.
CPC .......... *A01K 27/005* (2013.01); *A01K 27/001* (2013.01); *A44B 18/00* (2013.01); *Y10T 24/32* (2015.01)

(58) Field of Classification Search
CPC .............. A01K 27/005; A44D 2203/00; A44B 11/258; Y10T 24/32
See application file for complete search history.

(56) References Cited

U.S. PATENT DOCUMENTS

| | | | |
|---|---|---|---|
| 3,027,617 A | 4/1962 | Gray | |
| 3,086,268 A | 4/1963 | Chaffin | |
| 3,589,341 A | 6/1971 | Krebs | |
| 4,881,492 A | 11/1989 | Jones | |
| 5,322,037 A | 6/1994 | Tozawa | |
| 5,432,986 A * | 7/1995 | Sexton | A44C 5/2071 24/303 |
| 5,647,101 A | 7/1997 | Morita | |
| 5,701,849 A | 12/1997 | Suchowski | |
| D453,105 S | 1/2002 | Morita | |
| 6,360,404 B1 | 3/2002 | Mudge | |
| D457,834 S | 5/2002 | Morita | |
| 6,499,437 B1 | 12/2002 | Sorensen | |
| 6,857,169 B2 | 2/2005 | Chung | |
| 6,948,220 B2 | 9/2005 | Chen | |
| D602,397 S | 10/2009 | Heroux | |
| 7,954,211 B2 | 6/2011 | De Bien | |
| D671,443 S | 11/2012 | Paik | |
| 8,613,262 B1 | 12/2013 | Mergard | |
| 8,726,850 B2 | 5/2014 | Rosenquist | |
| 9,101,185 B1 | 8/2015 | Greenberg | |

(Continued)

FOREIGN PATENT DOCUMENTS

| | | | |
|---|---|---|---|
| CA | 2398593 | 6/2010 | |
| CA | 2956062 C * | 1/2019 | ........... B65D 83/303 |

(Continued)

OTHER PUBLICATIONS https://patentscope.wipo.int/search/en/detail.jsf?docId=KR92258291&_cid=P20-L6XQRM-96031-1 (Year: 2013).*

*Primary Examiner* — Monica L Perry
*Assistant Examiner* — Katherine Anne Kloecker
(74) *Attorney, Agent, or Firm* — Valauskas Corder LLC (57) ABSTRACT

An improved quick-release connector that may be used with a pet collar. The connector is fabricated entirely of metal and operates using one magnet. The connector is easily modified to break apart under different pull forces.

11 Claims, 8 Drawing Sheets

(56) References Cited

U.S. PATENT DOCUMENTS

| | | |
|---|---|---|
| 9,307,808 B1 | 4/2016 | Lill |
| 9,392,829 B2 | 7/2016 | Manuello |
| D817,810 S | 5/2018 | Chen |
| D818,393 S | 5/2018 | Chen |
| 10,117,421 B2 | 11/2018 | Durfee |
| D838,208 S | 1/2019 | Hirabayashi |
| D845,168 S | 4/2019 | Paik |
| 10,463,119 B1* | 11/2019 | Chambers ............ H05K 5/0217 |
| 11,033,083 B1* | 6/2021 | Moustafa ............. H01F 7/0263 |
| 11,425,969 B2* | 8/2022 | Li ........................ A44B 11/258 |
| 2003/0024079 A1* | 2/2003 | Morita ............... A45C 13/1084 24/303 |
| 2006/0144345 A1 | 7/2006 | Kover |
| 2008/0060172 A1 | 3/2008 | Moss |
| 2011/0174239 A1 | 7/2011 | Fricker |
| 2011/0265289 A1* | 11/2011 | Wu .................... A44B 17/0064 24/303 |
| 2013/0185901 A1 | 7/2013 | Heyman |
| 2013/0213320 A1 | 8/2013 | Lambert |
| 2013/0269629 A1 | 10/2013 | Holt |
| 2013/0305497 A1* | 11/2013 | Coman ............... B60R 13/0206 24/303 |
| 2014/0020214 A1* | 1/2014 | Ayvazian ............. A44C 5/2052 24/303 |
| 2021/0134501 A1* | 5/2021 | de la Rosa ........... H01F 7/0263 |
| 2022/0061469 A1* | 3/2022 | Tseng ..................... A44B 11/28 |

FOREIGN PATENT DOCUMENTS

| | | |
|---|---|---|
| CN | 203407330 | 1/2014 |
| CN | 208281430 | 12/2018 |
| EP | 2859792 | 4/2015 |
| EP | 2043475 | 8/2020 |
| GB | 2382375 | 5/2003 |
| JP | 20080060172 A1 | 5/2006 |
| JP | 3216846 | 6/2018 |
| JP | 3228989 U | 11/2020 |
| KR | 101246501 B1 * | 3/2013 |
| WO | 2019034948 | 2/2019 |

* cited by examiner

MAGNETIC QUICK-RELEASE CONNECTOR FOR PET COLLARS

FIELD OF THE INVENTION

The invention relates generally to a magnetic closure or connector. More specifically, the invention relates to a connector used to secure a collar around a pet's neck and configured to break apart or detach quickly, otherwise referred to as "quick-release".

Although the invention is discussed in reference to pet collar, any item that requires a connector is contemplated, for example, jewelry such as a necklace, a bracelet, a belt, etc.

BACKGROUND OF THE INVENTION

Owners typically provide their pets such as dogs and cats with collars. Collars may include tags to communicate information (owner name and number, current vaccinations, etc.). Collars may be made of any material and some are elaborate with adornments such as rhinestones, sequins, and jewels.

In certain situations, collars can be hazardous. Pets can entangle themselves in their own collars. This may be a result of incorrectly fitted collars such as being too loose around the neck of the pet. Furthermore, collars may catch on certain objects. If the animal cannot escape the collar, it may potentially choke causing injury or even death.

Thus, quick-release clasps are desirable that break apart with a pull force. A pull force is defined as the force that is responsible for an object to move from a state of rest. Quick-release pet collars are known, see, e.g., GB2382375, U.S. Pat. No. 8,726,850B2, US20130333634A1, U.S. Pat. Nos. 4,881,492A, 6,948,220B2. However, these are typically made from plastic and can include many parts. Furthermore, these quick-release pet collars require a pull force to break apart that is the same regardless of the pet size. Ideally, the clasp should break apart before a pull force equal to the weight of the pet is achieved. For example, a pet collar should break apart at a pull force that is 50%-75% of the animal's weight. So, a pet collar for a 12 pound cat that breaks apart at a pull force less than 12 pounds (e.g., 8 pounds) most likely would not break apart if worn by small kitten. It is a disadvantage that pet collars do not have a range of different pull forces required to separate the clasp.

One known clasp utilizes a two-part plastic housing. One part includes a magnet piece and the other part includes a metal piece. The magnet piece and metal piece are each contained within a plastic housing such that the surfaces of the housing and pieces are flush, or even with each other. The pieces are used to align the housings together so that a plastic locking mechanism can be engaged. In this design, the magnet/metal pieces are not contemplated to break apart the housing under a specified pull force. Instead, the plastic locking mechanism requires a particular pull force to disengage. Therefore, even though a magnet is utilized in the design, the plastic locking mechanism determines the pull force required to break the housing apart. The use of plastic is not aesthetically appealing and can be bulky compared to the band or strap.

Due to the mechanical design of the plastic locking mechanisms, they only operate when force is applied in one direction, i.e., in-line with the mechanism. The pet must pull with a strong enough force in-line with the mechanism otherwise it may not disconnect.

Accordingly, there is a need for an improved quick-release connector. The present invention satisfies this need.

SUMMARY OF THE INVENTION

The invention is directed to an improved quick-release connector that may be used with a pet collar. For purposes of this application, the invention is discussed with respect to a pet collar, but it is also contemplated that the connector may be used with jewelry such as necklaces and bracelets.

An advantage of the invention is a magnetic connector component that is easily modified to break apart under different pull forces. Different pull forces to break apart the connector are achieved by adjusting the surface area mating between housing elements of the connector. As the surface area mating between housing elements decreases, the pull force required to break apart the connector decreases. It is noted that the pull force required to break apart the connector is the pull force required to break the magnetic connection.

Another advantage of the invention is that it breaks apart when a pull force is not applied in-line with the connector component. A pull force unevenly applied to the connector component (e.g., the pet's collar catches on an object) causes the components to pivot with respect to each other and break apart the connector.

An advantage of the invention is a connector component with an improved design that is fabricated from only magnetic material such as metal (e.g., iron or iron alloy) and that requires only one magnet to operate.

The invention comprises a connector component comprising two housing elements that when brought together, snap shut. This makes it easy to put together with one hand, ideal for people with dexterity issues.

The present invention and its attributes and advantages will be further understood and appreciated with reference to the detailed description below of presently contemplated embodiments, taken in conjunction with the accompanying drawings.

DESCRIPTION OF THE DRAWING

The preferred embodiments of the invention are shown in the attached drawings.

DETAILED DESCRIPTION OF THE INVENTION

Although the invention is described with respect to cats, it is contemplated that the magnetic quick-release connector may be used on collars for any animal, e.g., dogs, zoo animals, etc.

The connector component 100 comprises a first housing element 100A and a second housing element 100B. The housing elements 100A, 100B are constructed from any magnetic material, e.g., metal such as iron or an iron alloy such as steel. More specific examples of magnetic materials that may be used to construct the housing elements 100A, 100B include ASTM 1018 (a low carbon steel with 99% iron), 17-4 PH (a precipitation hardening stainless steel with 73% iron), and ASTM 430 (a ferritic stainless steel with 79-87% iron).

Figure 1:
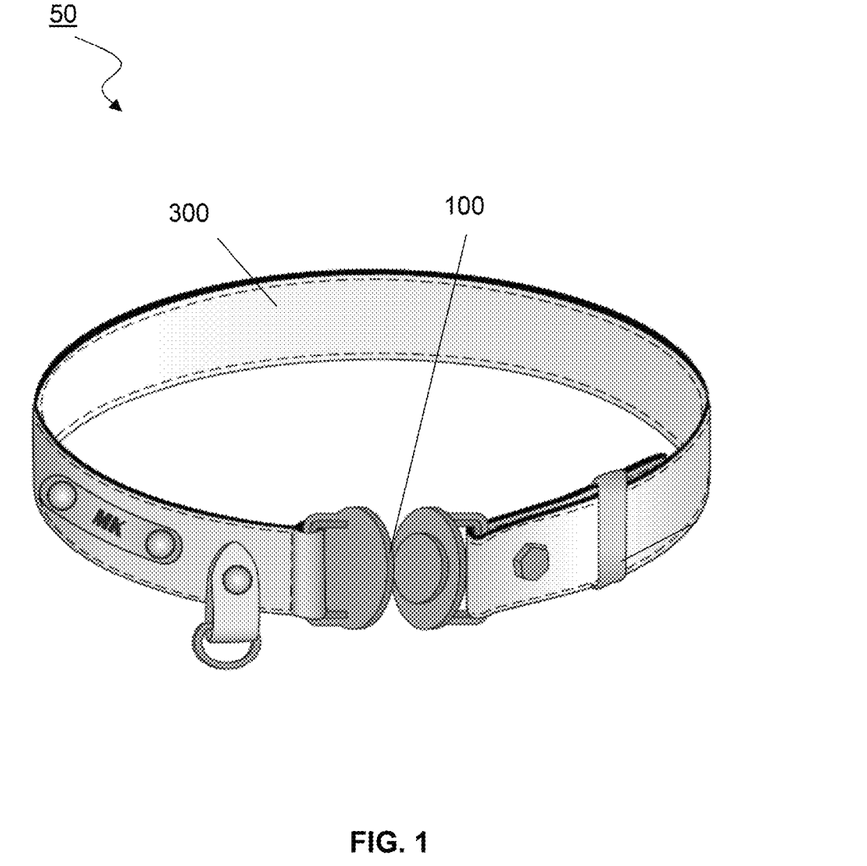
FIG. 1 illustrates a pet collar including a magnetic quick-release connector.
Figure 2:
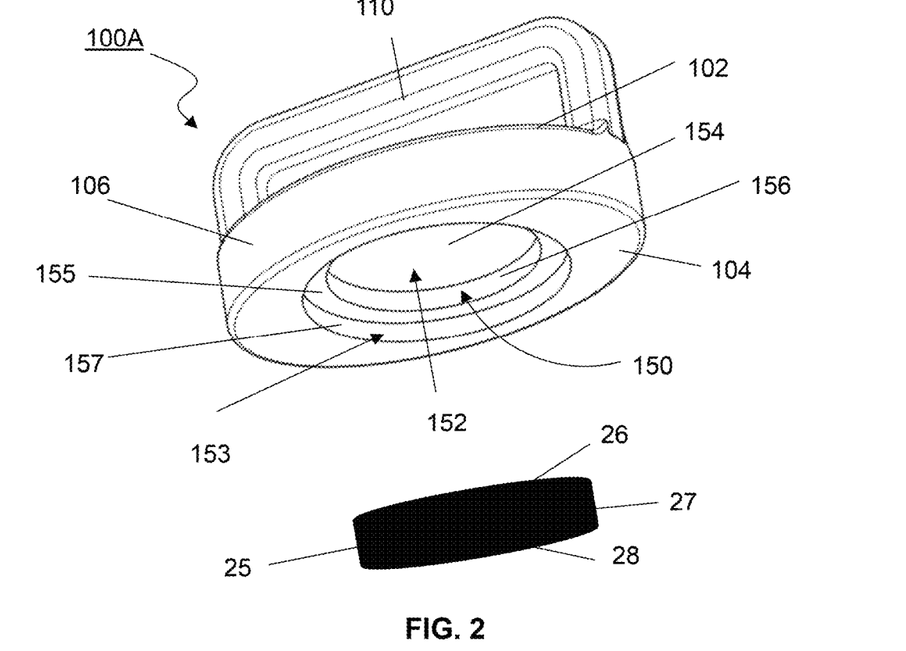
FIG. 2 illustrates an exploded perspective view of a first housing element.
Figure 3:
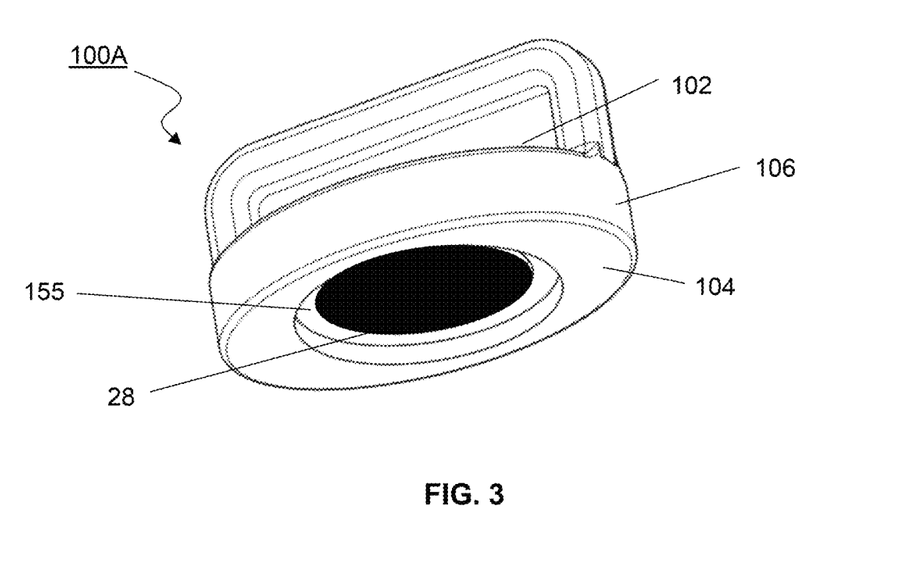
FIG. 3 illustrates an assembled perspective view of the first housing element.

FIG. 2 and FIG. 3 illustrate the first housing element, the first housing element 100A is defined by a top surface 102 and a bottom surface 104 joined by a side surface 106. The first housing element 100A has a first wall thickness defined between the top surface 102 and the bottom surface 104. A loop element 110 is connected to the top surface 102 and is configured to receive a portion of the strap component 200.

The first housing element 100A includes a centrally located receptacle element 150. The receptacle element 150 originates from the top surface 102 and comprises a top portion 152 and a bottom portion 153. The top portion 152 is defined by a base surface 154 surrounded by a border surface 156. The bottom portion 153 is defined by support surface 155 surrounded by a boundary surface 157.

Both border surface 156 and boundary surface 157 define a circular shape with the diameter of the top portion 152 smaller than the diameter of the bottom portion 153. As shown in FIG. 3, a magnet 25 is received within the top portion 152 of the receptacle element 150 and affixed to the housing element 100A so that a portion of the magnet 25 protrudes into the bottom portion 153. The magnet 25 is affixed to the housing element 100A using any known material or method, e.g., adhesive, welding, etc. The magnet 25 is sized and shaped so that a back surface 26 is positioned against the base surface 154 and a perimeter surface 27 is positioned near or against the border surface 156. As such, the front surface 28 of the magnet 25 protrudes, i.e., slightly raised (e.g., 0.1 mm), above the support surface 155 of the bottom portion 153 as shown in FIG. 3.

The magnet 27 is configured so that the polarity (magnetic field) of the front surface 28 attracts to the magnetic properties of the second housing element 100B, which is fabricated from a magnetic material.

Any type of magnet is contemplated, such as those fabricated with material such as Neodymium, Iron, Nickel, Cobalt, Born, or any combination of these.

Figure 4:
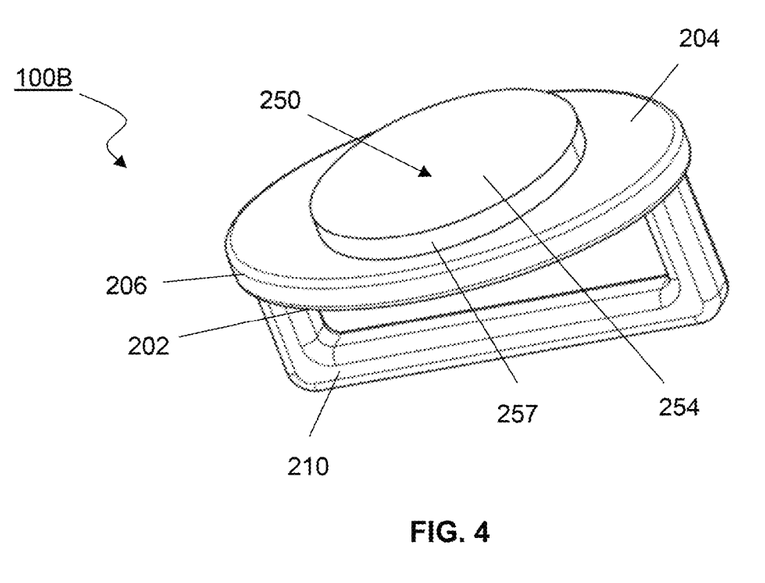
FIG. 4 illustrates a perspective view of a second housing element according to a first embodiment of the invention.
Figure 5A:
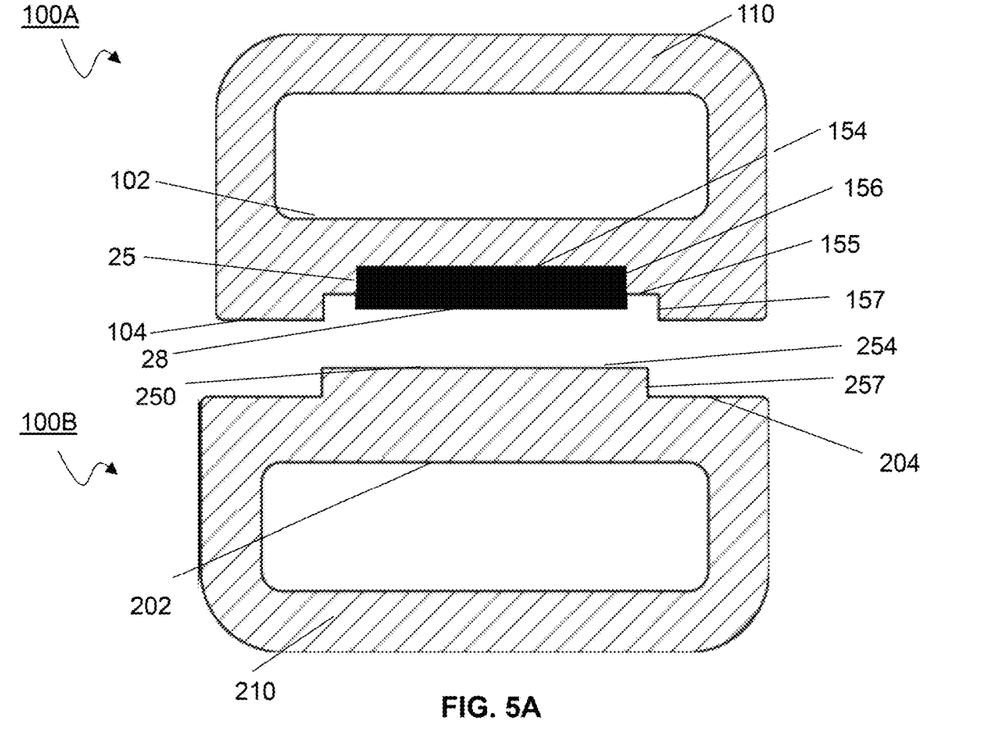
FIG. 5A illustrates a side view of a connector component comprising the first housing element and the second housing element according to the first embodiment of the invention.
Figure 5B:
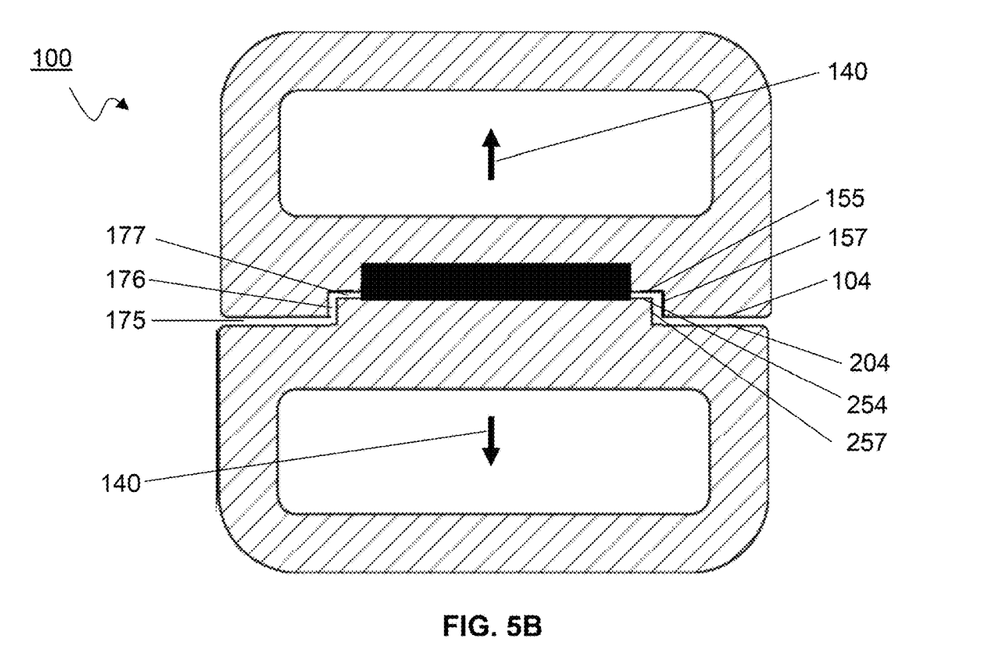
FIG. 5B illustrates a side view of the connector component of FIG. 5A with the housing elements joined together.

FIG. 4, FIG. 5A, FIG. 5B illustrate embodiments of the second housing element. The second housing element 100B is defined by a top surface 202 and a bottom surface 204 joined by a side surface 206. The second housing element 100B has a second wall thickness defined between the top surface 202 and the bottom surface 204. A loop element 210 is connected to the top surface 202 and is configured to receive a portion of the strap component 200.

The second housing element 100B includes a centrally located protrusion element 250. The protrusion element 250 originates from the top surface 202 and is defined by a support surface 254 surrounded by a boundary face 257.

As shown in FIG. 5B, the first housing element 100A and second housing element 100B are joined together using magnetism—the polarity of the magnet 25 and the magnetic properties of the metal material of both housings elements 100A, 100B join the connector component 100. Specifically, the second housing element 100B responds to the magnetic field of the magnet of based on the grain structure and chemistry of the metal from which it is fabricated. Once the first housing element 100A including magnet 25 is un-joined with the second housing element 100B, the metal returns to neutral (magnetically).

When connected, the protrusion element 250 is received within the bottom portion 153 of the first housing element 100A so that the boundary face 257 is surrounded by boundary surface 157. As shown in this embodiment, the front surface 28 of the magnet 25 is slightly raised above the support surface 155 to ensure that the support surface 254 of the protrusion element 250 always mates with the entire front surface 28 of the magnet 25.

As a result of the magnet 25 being slight raised above the support surface 155, gaps are provided when the housing elements 100A, 100B are joined. The bottom surface 104 of the first housing element 100A is spaced apart from the bottom surface 204 of the second housing element 100B providing a gap 175 and the support surface 155 of the first housing element 100A is space apart from the boundary face 257 of the second housing element 100B resulting in gap 177. The diameter of protrusion element 250 on second housing element 100B is less than the diameter of boundary surface 157 on the first housing element 100A resulting in a gap 176.

Figure 5C:
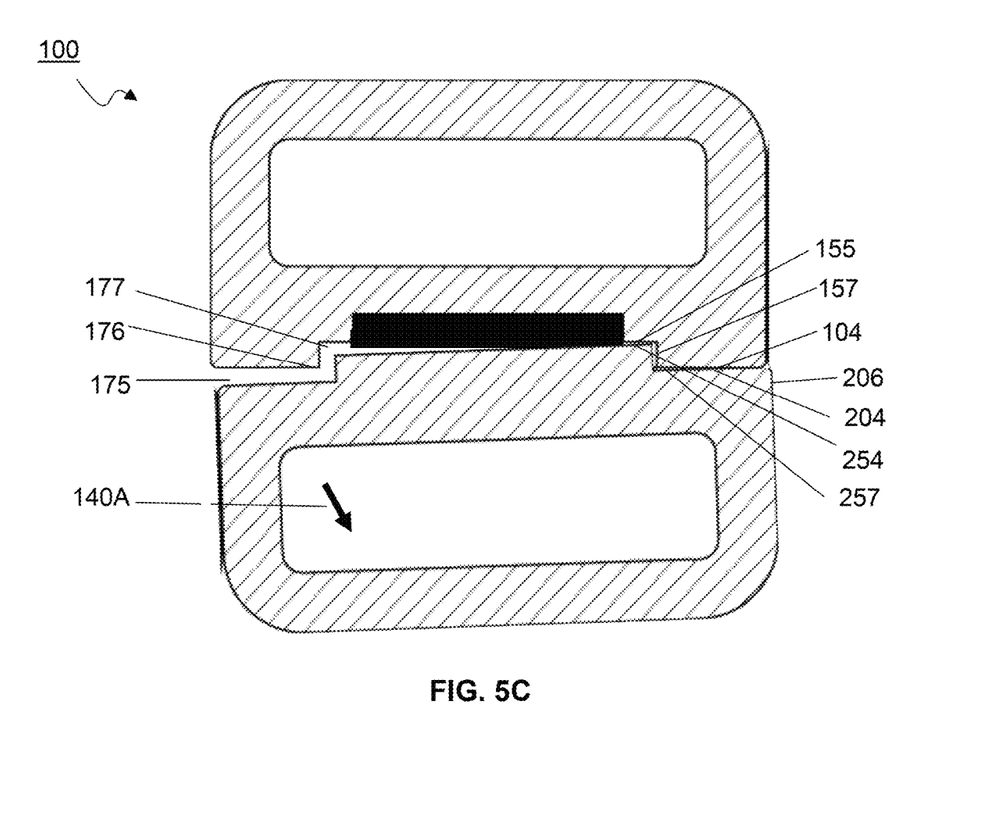
FIG. 5C illustrates a side view of the connector component with the housing elements breaking apart.

The gaps 175, 176, and 177 permit the housing elements 100A, 100B to pivot with respect to each other assisting the housing elements 100A, 100B to break apart should the pet not pull in-line (as shown by arrow 140) with the connector component 100. This is illustrated more specifically in FIG. 50. As an uneven pull force (shown by arrow 140A) is applied (such as when a cat's collar catches on an object), the housing elements 100A, 100B pivot with respect to each other. When the housing elements 100A, 100B pivot with respect to each other, one or more points of contact between the housings elements 100A, 100B assist in breaking apart the connector component 100. The one or more points of contact include: a corner defined by the intersection of the support surface 254 and the boundary face 257 of the second housing element 100B hits a portion of the first housing element 100A (i.e., support surface 155), a corner defined by the intersection of the boundary face 257 and the bottom surface 204 of the second housing element 100B hits a portion of the first housing element 100A (i.e., corner defined by the intersection of the boundary surface 157 and the bottom surface 104), a corner defined by the intersection of the side surface 206 and the bottom surface 204 of the second housing element 100B hits a portion of the first housing element 100 (i.e., bottom surface 104), or all occur simultaneously. The one or more points of contact may be determined by the size of gaps 175, 176, 177. It is contemplated that the size of the gaps 175, 176, 177 may be varied to change the pull force required to break the connector component 100 under an uneven applied force. It should be noted that an uneven pull force required to break apart the connector component 100 may be less than the required in-line pull force.

The surface area of the protrusion element 250 that mates with the magnet 25 is directly proportional to the pull force required to break apart the connector component 100. The more area of the support surface 254 of the protrusion element 250 that mates with the front surface 28 of the magnet 25, the greater the pull force (in-line and uneven) required to break apart the connector component 100.

Figure 6A:
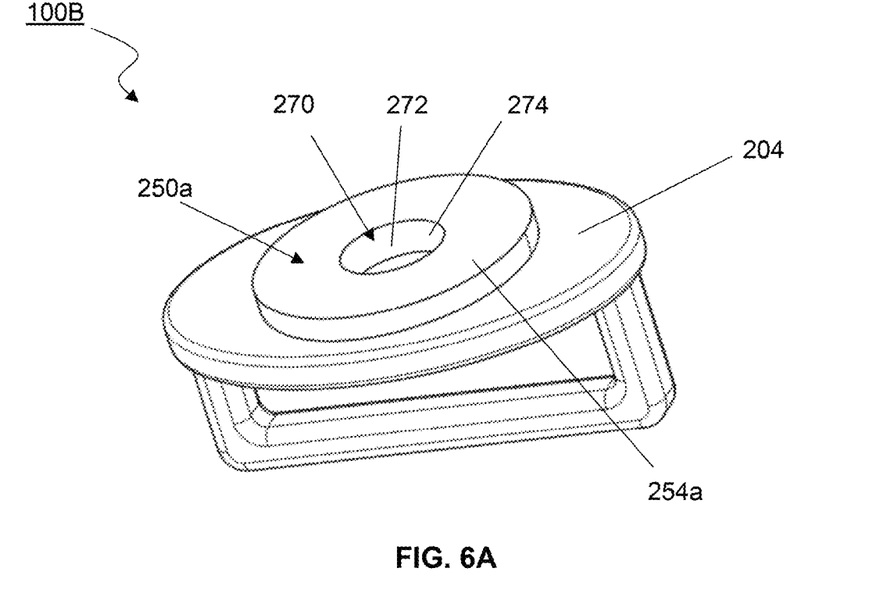
FIG. 6A illustrates a perspective view of a second housing element according to a second embodiment of the invention.
Figure 6B:
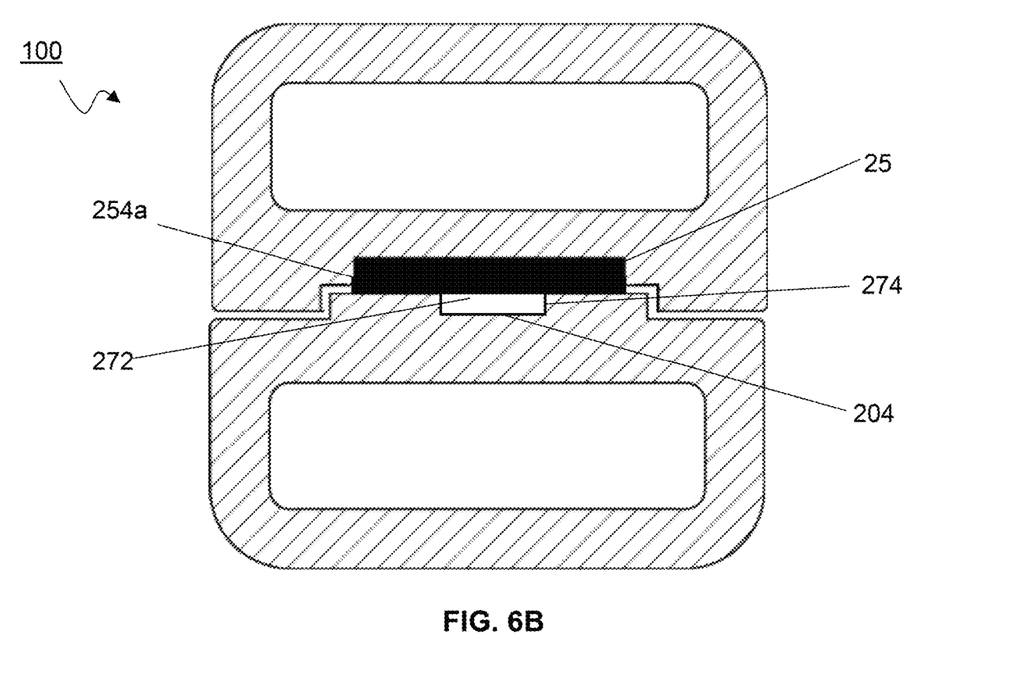
FIG. 6B illustrates a side view of a joined connector component comprising the first housing element and the second housing element of FIG. 6A.
Figure 7A:
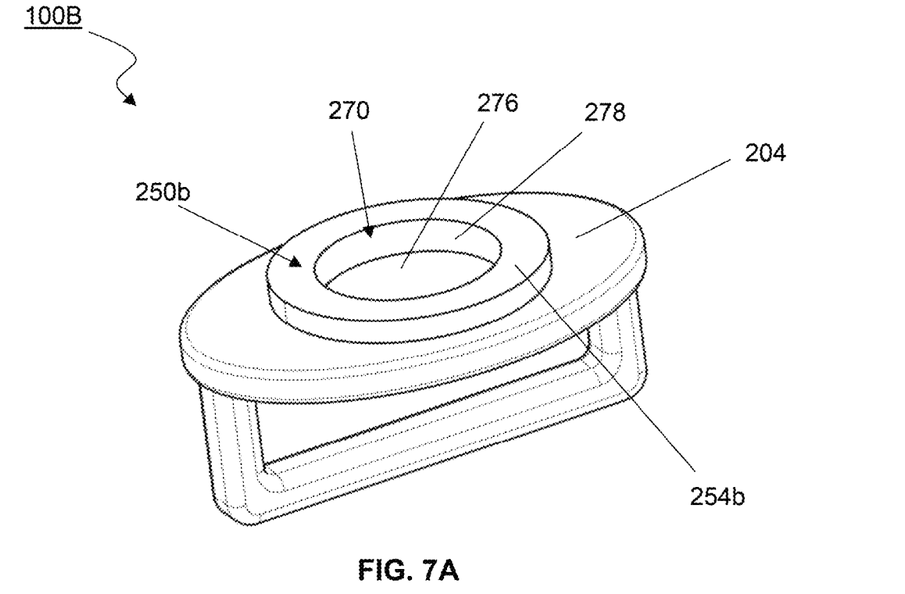
FIG. 7A illustrates a perspective view of a second housing element according to a third embodiment of the invention.
Figure 7B:
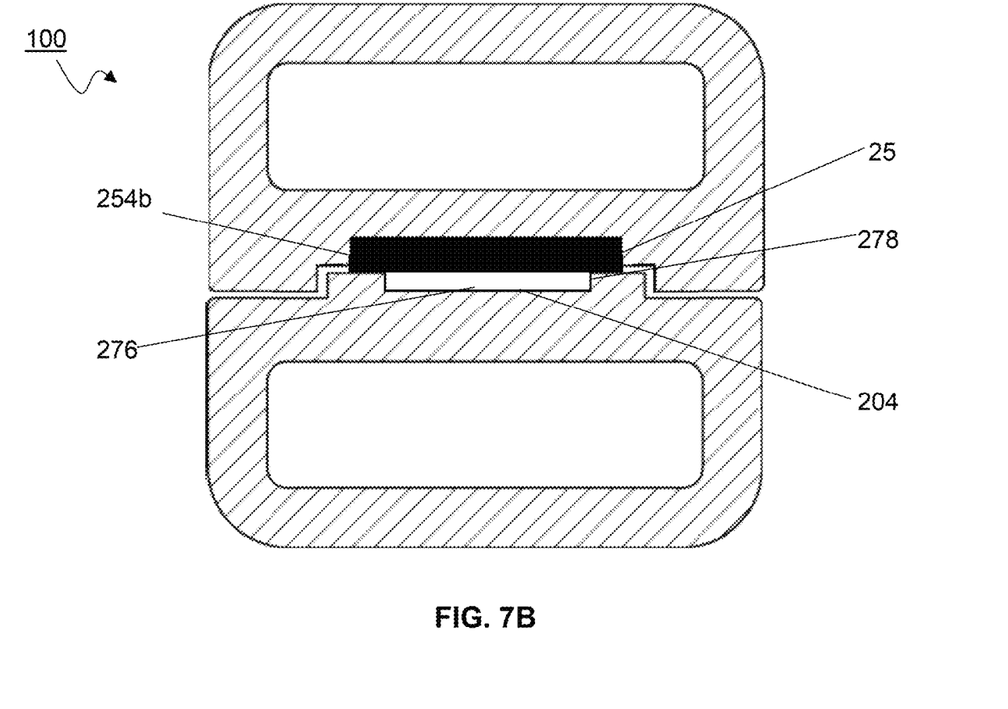
FIG. 7B illustrates a side view of a joined connector component comprising the first housing element and the second housing element of FIG. 7A.

Therefore, the invention contemplates embodiments in which the area of the support surface 254 of the protrusion element 250 that mates with the magnet 25 varies through use of a cavity element 270 as shown in FIG. 6 and FIG. 7. By removing portions of the material from the protrusion element 250, the area of the protrusion element 250 that mates with the magnet 25 decreases, which decreases the pull force required to break apart the connector component.

FIG. 6A and FIG. 6B illustrates a perspective view of a second housing element 100B according to a second embodiment of the invention. According to this embodiment, the pull force is decreased with respect to the embodiment of FIG. 4. Cavity element 270 is a circular aperture 272 defined by edge surface 274 and bound by the bottom surface 204 of the housing element 100B. The pull force is decreased from that required by the embodiment shown in FIG. 4, by reducing the area of support surface as shown by 254a that mates with magnet 25.

FIG. 7A and FIG. 7B illustrates a perspective view of a second housing element 100B according to a third embodiment of the invention. According to this embodiment, the pull force is decreased with respect to the embodiment of FIG. 4 and FIG. 5A. Cavity element 270 is a larger circular aperture 276 defined by edge surface 278 and bound by the bottom surface 204 of the housing element 100B. The pull force is decreased from that required by the embodiment shown in FIG. 4, by reducing the area of support surface as shown by 254b that mates with the magnet.

The following Table provides data for a preferred embodiment of the invention:

| First Housing with Magnet | | Second Housing Element | | | |
| --- | --- | --- | --- | --- | --- |
| First Housing Thickness (mm) | Magnet Diameter (mm) | Protrusion Diameter (mm) | Cavity Diameter (mm) | Second Housing Thickness (mm) | Median Pull Force (lbs) |
| 2.15 | 6.4 | 10 | 5 | 1.7 | 4.7 |
| 2.15 | 6.4 | 10 | 3 | 1.7 | 6.0 |
| 2.15 | 6.4 | 10 | 0 | 2.7 | 6.6 |
| 2.15 | 7.9 | 10 | 5 | 1.7 | 7.7 |
| 2.15 | 7.9 | 10 | 0 | 2.95 | 8.5 |
| 2.55 | 7.9 | 10 | 5 | 1.7 | 8.4 |
| 2.55 | 7.9 | 10 | 0 | 2.95 | 10.3 |
| 2.95 | 7.9 | 10 | 5 | 1.7 | 9.6 |
| 2.95 | 7.9 | 10 | 3 | 1.7 | 11.1 |
| 2.95 | 7.9 | 10 | 0 | 2.95 | 13.0 |

Figure 8:
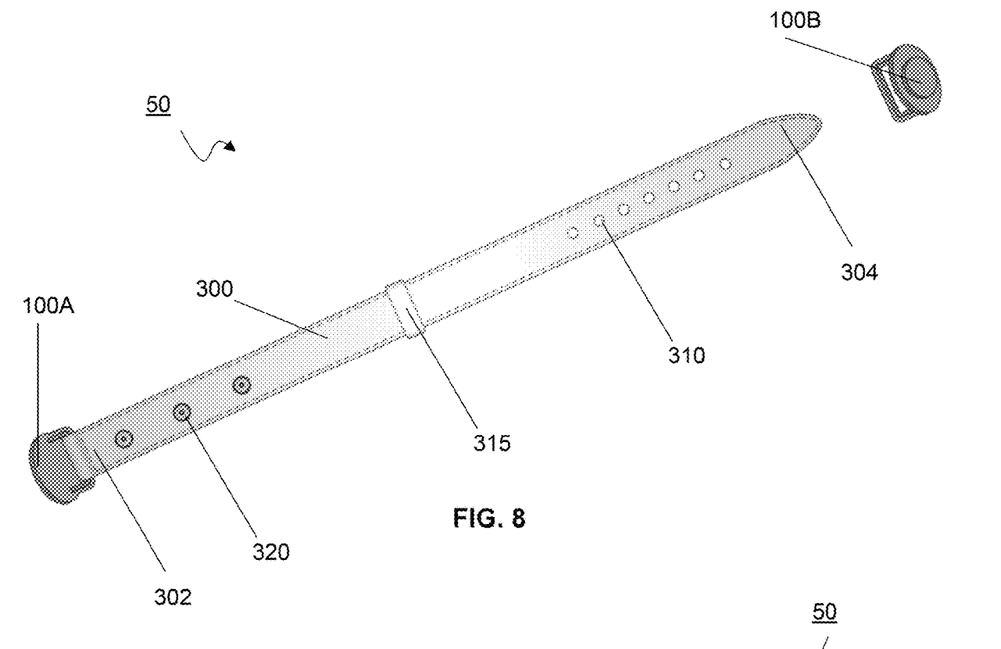
FIG. 8 illustrates a pet collar including a magnetic quick-release connector.

FIG. 8 illustrates a pet collar 50 including a magnetic quick-release connector comprising a first housing element 100A and a second housing element 100B. A strap component 300 extends from a first end 302 to a second end 304 and is a generally thin flat object. A first housing element 100A is attached to the first end 302 of the strap component 300. A second housing element 100B is attached to a second end 304 by using a fastener (see element 356 of FIG. 9) through two of the aperture elements 310 of the strap component 300. The second housing element 100B may be moved according to different aperture elements 310 to adjust the length of the strap component 300 positioned around the neck of the animal. Also, the second housing element 100B may be easily exchanged for another housing element 100B with a different pull force as the pet changes in weight. For example, the pet may start using the collar according to the invention at 10 pounds and grow to 18 pounds. While the first housing element 100A may be permanently attached to the strap component 300, the second housing element 100B may be changed as the pet grows. For example, based on the Table above, the first housing element 100A may be changed from a cavity diameter of 7 with a pull force of 7 pounds to a cavity diameter of 5.5 mm with a pull force of 9.5 pounds.

Figure 9:
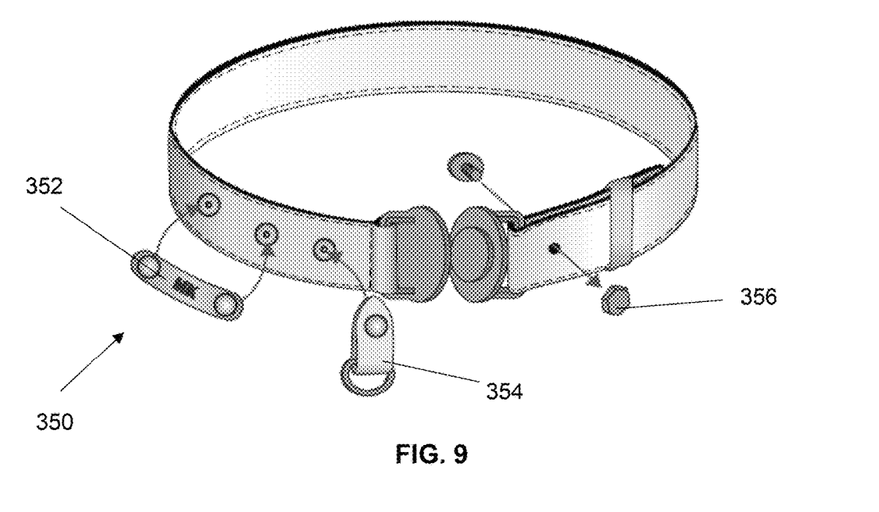
FIG. 9 illustrates a pet collar including a magnetic quick-release connector.

The strap component 300 may also include one or more attachment elements 320 configured to secure accessories. FIG. 9 illustrates a pet collar according to the invention with other accessories 350 such as a name tag 352, lanyard 354 (e.g., to secure additional items such as a bell, medical tag, or adornment).

It is contemplated that as an alternative to the cavity element, the magnet grade, magnet material and magnet size can be varied to achieve desired pull forces. It is further contemplated that the connector component may include housing elements that join and lock together, for example, a first housing element that pivots with respect to the second housing element to interlock them.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An improved quick-release connector component for use with an animal collar and configured to break apart under different pull forces, consisting of:
   a first housing element comprising a first top surface and a first bottom surface joined by a first side surface, the first housing element having a first wall thickness defined between the first top surface and the first bottom surface,
      the first housing element including a receptacle element, wherein the receptacle element includes a support surface between top portion and a bottom portion, the top portion defined by a circle shaped base surface surrounded by a border surface that is perpendicular to the base surface, the top portion having a first diameter, the bottom portion defined by the support surface surrounded by a boundary surface that is perpendicular to the support surface, the bottom portion having a second diameter, wherein the first diameter is less than the second diameter,
   a magnet, comprising a front surface and a back surface joined by a perimeter surface, the magnet having a diameter, the magnet affixed within the top portion of the receptacle element so that the back surface abuts the base surface, and the perimeter surface abuts the border surface, wherein a portion of the magnet protrudes above the support surface and into the bottom portion, such that the front surface is located a distance from the support surface, and a second housing element comprising a second top surface and a second bottom surface joined by a second side surface, the second housing element having a second wall thickness defined between the second top surface and the second bottom surface, the second housing element constructed entirely from a magnetic material, the second housing element including a protrusion element originating from the second top surface and defined by a support surface surrounded by a boundary face, the protrusion element having a diameter, wherein the bottom portion of the receptacle element of the first housing is configured to receive the protrusion element of the second housing so that the support surface of the protrusion mates with the front surface of the magnet, wherein the protrusion element is configured to be modified to include a cavity element for changing a surface area of the support surface of the protrusion element that mates with the surface of the magnet.

2. The connector component of claim 1, wherein both the first housing and the second housing are constructed from metal.

3. The connector component of claim 1, wherein both the first housing and the second housing each include a loop element configured to receive a portion of a strap element.

4. The connector component of claim 1, wherein the receptacle is centrally located on the first housing element.

5. The connector component of claim 1, wherein the magnet is fabricated with one or more materials selected from the group comprising: Neodymium, Iron, Nickel, Cobalt, Born.

6. The connector component of claim 1, wherein the cavity element is a circle-shape aperture defined by the second bottom surface and an edge surface that is perpendicular to the second bottom surface, the cavity element having a diameter, the cavity element decreasing the surface area of the support surface of the protrusion element that mates with the front surface of the magnet.

7. The connectors component of claim 1, wherein the receptacle element includes a support surface configured to be used by the protrusion element as a lever to push against which assist to quickly break the magnetic connection between the housing elements.

8. The connector component of claim 1, wherein the first housing element and the second housing element are configured to pivot with respect to each other so that a portion of the protrusion element hits a portion of the first housing element to break apart the connector component.

9. The connector component of claim 1, wherein the magnetic material is one or more selected from the group consisting of: low carbon steel, a precipitation hardening stainless steel, and a ferritic stainless steel.

10. The connector component of claim 1, wherein the portion is 0.1 mm of the magnet that protrudes above the support surface and into the bottom portion of the receptacle.

11. The connector component of claim 1, wherein the first housing element and the second housing element are joined creating a first gap between the first bottom surface and the second bottom surface, a second gap between the support surface of the protrusion element and the support surface of the receptacle element, and a third gap between the boundary face of the protrusion element and the boundary surface of the first housing element.

* * * * *